United States Patent
Shitara

(10) Patent No.: US 9,781,771 B2
(45) Date of Patent: Oct. 3, 2017

(54) WIRELESS CIRCUIT

(71) Applicant: Sharp Kabushiki Kaisha, Sakai, Osaka (JP)

(72) Inventor: Shoichi Shitara, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/302,217

(22) PCT Filed: Apr. 27, 2015

(86) PCT No.: PCT/JP2015/062710
§ 371 (c)(1),
(2) Date: Oct. 6, 2016

(87) PCT Pub. No.: WO2015/166916
PCT Pub. Date: Nov. 5, 2015

(65) Prior Publication Data
US 2017/0034871 A1    Feb. 2, 2017

(30) Foreign Application Priority Data

May 1, 2014    (JP) .................................. 2014-094545

(51) Int. Cl.
*H04M 1/00*    (2006.01)
*H04L 5/04*    (2006.01)
*H04W 88/06*    (2009.01)
*H04B 1/00*    (2006.01)

(52) U.S. Cl.
CPC ............ *H04W 88/06* (2013.01); *H04B 1/006* (2013.01)

(58) Field of Classification Search
CPC .................................................. H04W 88/06
USPC ........................................ 455/552.1, 41, 41.2
See application file for complete search history.

(56) References Cited

U.S. PATENT DOCUMENTS

| | | | | |
|---|---|---|---|---|
| 9,042,825 B2* | 5/2015 | Banerjea | .............. | H04B 1/0064 |
| | | | | 370/329 |
| 9,467,260 B2* | 10/2016 | Bi | ......................... | H04L 5/0042 |
| 9,554,413 B2* | 1/2017 | Burra | ................ | H04W 28/0284 |
| 2010/0316027 A1* | 12/2010 | Rick | ..................... | H04W 88/06 |
| | | | | 370/336 |
| 2011/0249603 A1 | 10/2011 | Rick et al. | | |
| 2013/0072135 A1* | 3/2013 | Banerjea | ................ | H04B 1/525 |
| | | | | 455/83 |

FOREIGN PATENT DOCUMENTS

| | | |
|---|---|---|
| JP | 07-327258 A | 12/1995 |
| JP | 2012-530473 A | 11/2012 |

OTHER PUBLICATIONS

Official Communication issued in International Patent Application No. PCT/JP2015/062710, dated Jun. 23, 2015.

(Continued)

*Primary Examiner* — Tilahun B Gesesse
(74) *Attorney, Agent, or Firm* — Keating & Bennett, LLP

(57) ABSTRACT

A wireless circuit that can make plural types of wireless communications using an unlicensed spectrum is achieved with fewer components. High-frequency circuit devices (13 through 23) and a modem processing section (51) process LTE wireless signals. High-frequency circuit devices (33 through 43) and a modem processing section (51) process LTE-U wireless signals. High-frequency circuit devices (33 through 43) and a modem processing section (61) process Wi-Fi wireless signals.

4 Claims, 6 Drawing Sheets

(56) References Cited

OTHER PUBLICATIONS

Cisco, "On LTE in Unlicensed Spectrum", 3GPP TSG-RAN Meeting #62, RP-131749, Dec. 3-6, 2013, 3 pages.
Qualcomm, "Extending the benefits of LTE Advanced to unlicensed spectrum", Nov. 2013, 21 pages.
Qualcomm et al., "Introducing LTE in Unlicensed Spectrum", 3GPP RAN #62, RP-131635, Dec. 3-7, 2013, 8 pages.

* cited by examiner

WIRELESS CIRCUIT

TECHNICAL FIELD

The present invention relates to a wireless circuit that can make wireless communications using an unlicensed spectrum.

BACKGROUND ART

Recent development in various media and high informatization in society have caused an abrupt increase in data traffic of mobile communications. This has made it difficult to supply sufficient data traffic only through communications (e.g., 2G communication, 3G communication, and LTE communication) using licensed spectrums (spectrums that are assigned to telecommunication common carriers or that are authorized or licensed to telecommunication common carriers).

In order to relieve such a situation, attempts have been made to partially offload data traffic through a Wi-Fi (registered trademark, the rest is omitted) communication, which uses an unlicensed spectrum, an unlicensed band, or an ISM band.

Non-Patent Literatures 1 and 2 each propose, as a technique for more efficiently utilizing an unlicensed spectrum, an LTE-U communication in which an LTE communication is made using an unlicensed spectrum.

The LTE-U communication is made so as to accompany an LTE communication (in the present specification, simply referred to as the "LTE communication"), which uses a licensed spectrum, and is used to partially offload downlink data traffic of the LTE communication with use of scheme such as a carrier aggregation or a supplemental downlink. It has also been considered to offload part of uplink data traffic of the LTE communication in the future.

The LTE-U communication is superior to the Wi-Fi communication in terms of, for example, the following points (1) through (3). (1) The LTE-U communication can share a wireless access network (and a core network) with the LTE communication. (2) Devices freely make communications during the Wi-Fi communication, whereas a more efficient communication is made by exchanging control signals via the LTE communication. (3) A device that makes the LTE-U communication less affects Wi-Fi devices than the Wi-Fi devices themselves affect each other. Meanwhile, the fact that there are many existing base stations (i.e., access points (AP)) is advantageous to the Wi-Fi communication.

CITATION LIST

Non-Patent Literature

Non-Patent Literature 1
"Introducing LTE in Unlicensed Spectrum", Qualcomm, Ericsson (downloaded on Apr. 25, 2014, http://www.3gpp.org/ftp/tsg_ran/TSG_RAN/TSGR_62/Docs/RP-131635.zip)

Non-Patent Literature 2
"Extending the benefits of LTE Advanced to unlicensed spectrum", Qualcomm (downloaded on Apr. 25, 2014, http://www.qualcomm.com/media/documents/files/extending-the-benefits-of-lte-advanced-to-unlicensed-spectrum.pdf)

SUMMARY OF INVENTION

Technical Problem

As described above, there are plural types of wireless communications using an unlicensed spectrum. Such wireless communications, using an unlicensed spectrum, include a wireless communication that accompanies a wireless communication using a licensed spectrum. FIG. 6 illustrates an envisioned example configuration of a wireless circuit that can make plural types of wireless communications using an unlicensed spectrum. The wireless circuit illustrated in FIG. 6, however, requires many antennas and many circuit devices. This makes it difficult to achieve a downsized device.

The present invention is attained in view of the above problem. An object of the present invention is to provide a technique for achieving, with fewer components, a wireless circuit that can make plural types of wireless communications using an unlicensed spectrum.

Solution to Problem

In order to attain the above object, a wireless circuit in accordance with an aspect of the present invention includes: at least one first high-frequency circuit device connected to at least one antenna; at least one second high-frequency circuit device connected to at least one antenna; a first modem processing section connected to the at least one first high-frequency circuit device and the at least one second high-frequency circuit device; and a second modem processing section connected to the at least one second high-frequency circuit device, wherein: the at least one first high-frequency circuit device and the first modem processing section process wireless signals corresponding to a first wireless communication method, by which a first wireless communication is made through a licensed spectrum; the at least one second high-frequency circuit device and the second modem processing section process wireless signals corresponding to a second wireless communication method, by which a second wireless communication is made through an unlicensed spectrum, the second wireless communication being independently of the first wireless communication; and the at least one second high-frequency circuit device and the first modem processing section process wireless signals corresponding to a third wireless communication method, by which a third wireless communication is made through the unlicensed spectrum, the first wireless communication being accompanied by the third wireless communication.

Advantageous Effects of Invention

An aspect of the present invention makes it possible to provide, with fewer components, a wireless circuit that can make plural types of wireless communications using an unlicensed spectrum.

DESCRIPTION OF EMBODIMENTS

Figure 1:
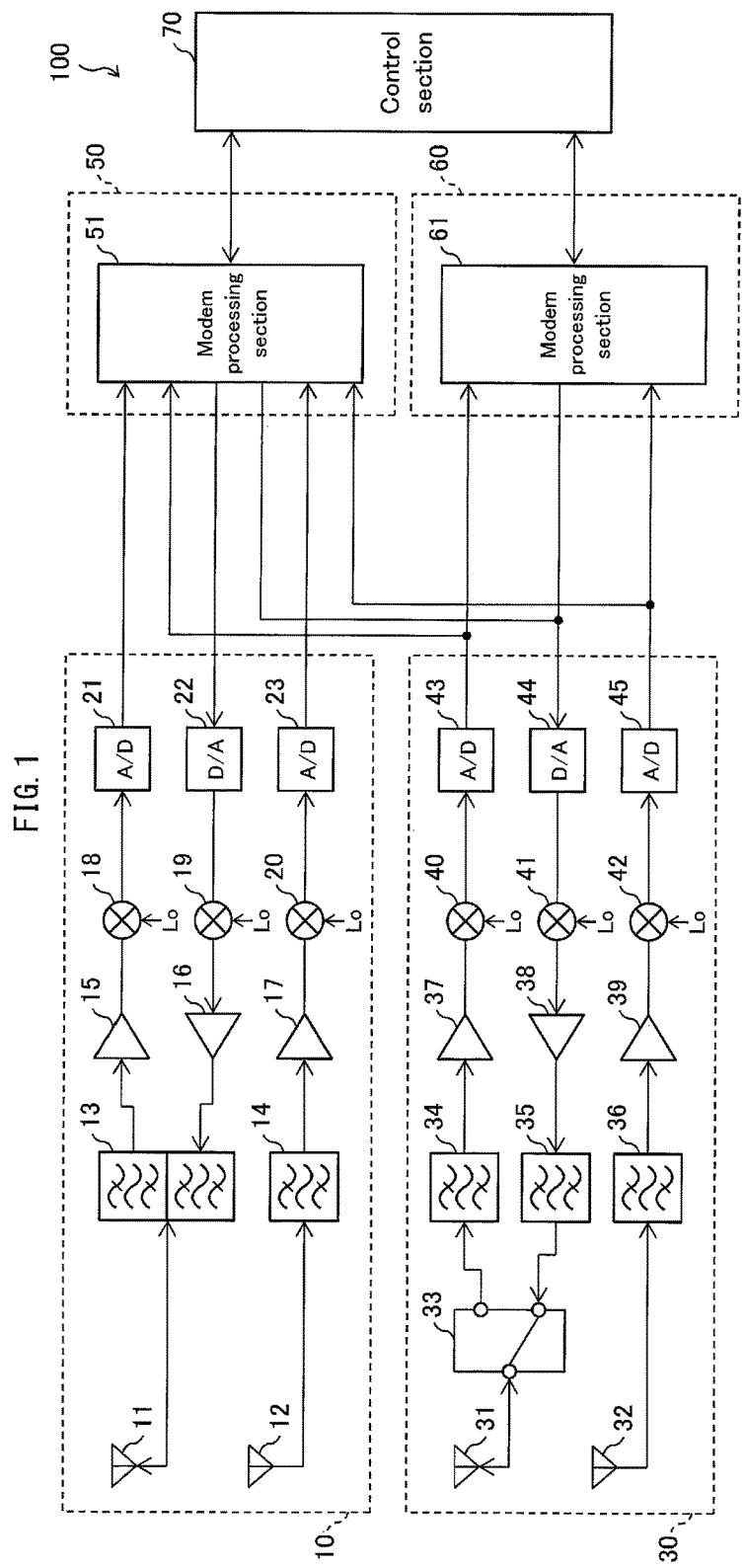
FIG. 1 is a block diagram illustrating a schematic configuration of a wireless circuit in accordance with an embodiment of the present invention.

The present invention provides a wireless circuit including: at least one first high-frequency circuit device connected to at least one antenna; at least one second high-frequency circuit device connected to at least one antenna; a first modem processing section connected to the at least one first high-frequency circuit device and the at least one second high-frequency circuit device; and a second modem processing section connected to the at least one second high-frequency circuit device, wherein: the at least one first high-frequency circuit device and the first modem processing section process wireless signals corresponding to a first wireless communication method, by which a first wireless communication is made through a licensed spectrum; the at least one second high-frequency circuit device and the second modem processing section process wireless signals corresponding to a second wireless communication method, by which a second wireless communication is made through an unlicensed spectrum, the second wireless communication being independently of the first wireless communication; and the at least one second high-frequency circuit device and the first modem processing section process wireless signals corresponding to a third wireless communication method, by which a third wireless communication is made through the unlicensed spectrum, the first wireless communication being accompanied by the third wireless communication.

With the configuration, the first wireless communication and the third wireless communication can be made with use of different antennas and different high-frequency circuit devices. This makes it possible to make the third wireless communication so that the first wireless communication is accompanied by the third wireless communication. This ultimately makes it possible to make (i) a wireless communication by the first wireless communication method and (ii) a wireless communication by the third wireless communication method in a collaborative manner (e.g., a carrier aggregation or a supplemental downlink used in a long-term evolution (LTE)). According to the configuration, (i) the first modem processing section is shared by the first wireless communication method and the third wireless communication method and (ii) the second antenna and the second high-frequency circuit device are shared by the second wireless communication method and the third wireless communication method. This allows a reduction in the number of components. It is thus possible to achieve, with fewer components, a wireless circuit that can make plural types of wireless communications using an unlicensed spectrum.

The following description will discuss an example in which (i) an LTE (including LTE-Advanced), which uses a licensed spectrum assigned to a telecommunication carrier, is employed as the first wireless communication method, (ii) a Wi-Fi, which uses a 5-GHz band (i.e., an unlicensed spectrum), is employed as the second wireless communication method, and (iii) an LTE-U, which also uses the 5-GHz band (i.e., the unlicensed spectrum), is employed as the third wireless communication method. The present invention, however, is not limited to as such. The present invention can employ, as appropriate, (i) a first wireless communication method that makes a first wireless communication using a licensed spectrum, (ii) a second wireless communication method that makes a second wireless communication using an unlicensed spectrum, the second wireless communication being independently of the first wireless communication, and (iii) a third wireless communication method that makes, in a manner similar to the first wireless communication method, a third wireless communication using the unlicensed spectrum, the first wireless communication being accompanied by the third wireless communication.

Note that the following description will discuss an example in which the wireless circuit in accordance with the present invention is employed in a communication device such as a mobile phone or a smartphone. However, a device that employs the wireless circuit in accordance with the present invention is not particularly limited. Alternatively, the wireless circuit can be employed in an electronic device that is different from the communication device, such as a tablet, a wearable information device, a laptop, or a smart home appliance.

Embodiment 1

Figure 2:
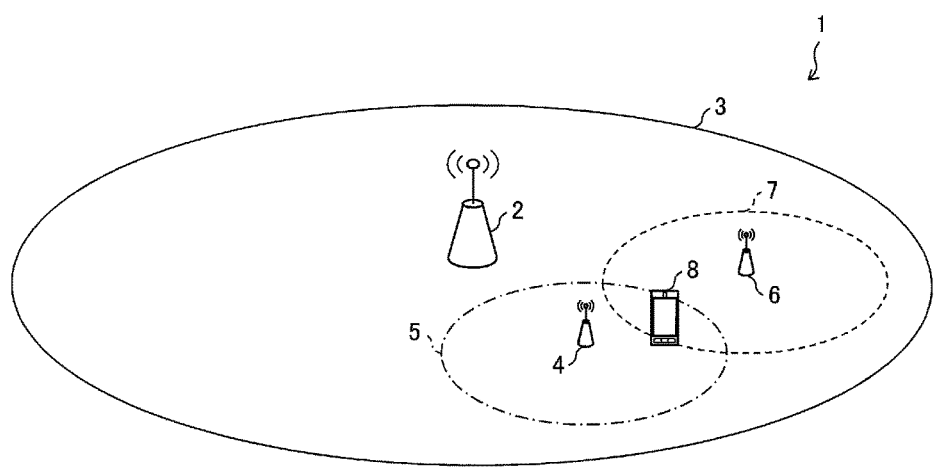
FIG. 2 is a view illustrating an example configuration of a main part of a system in which the wireless circuit in accordance with the embodiment of the present invention is used.
Figure 3:
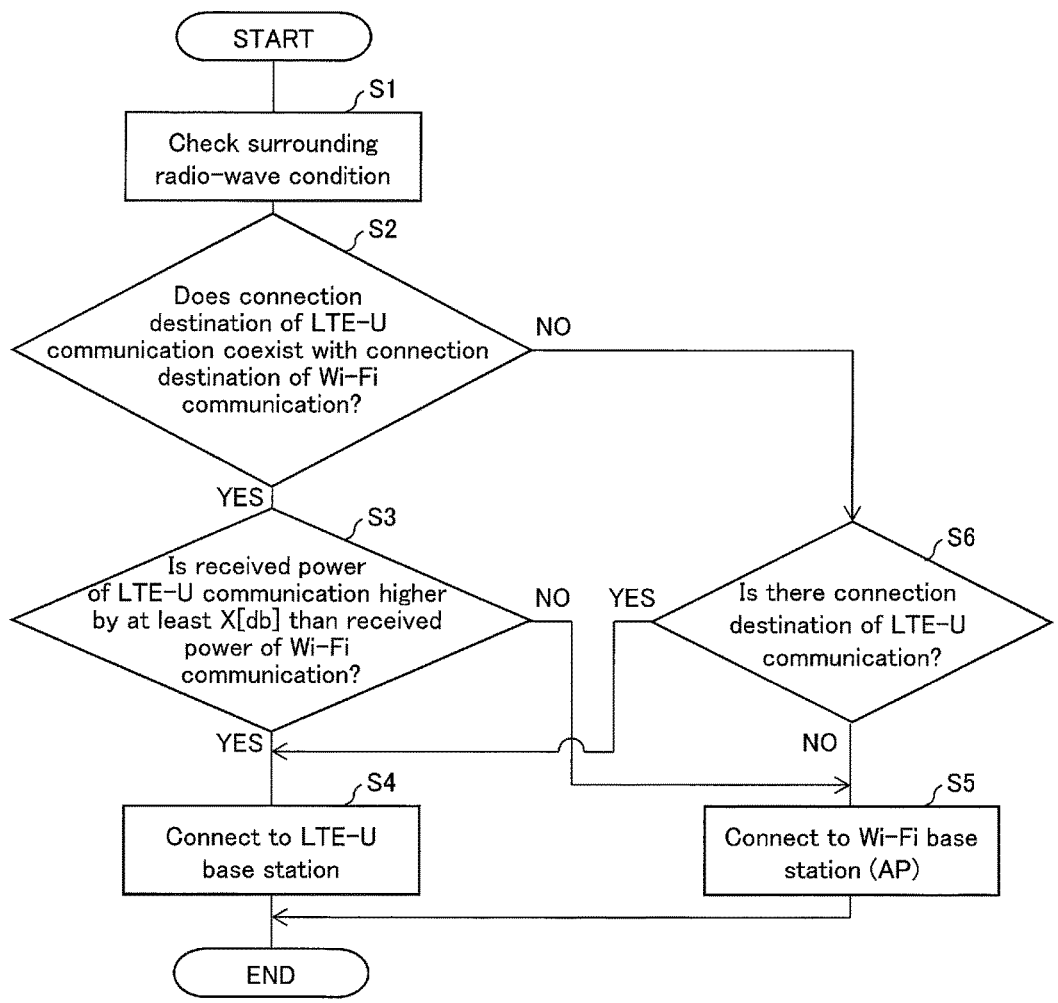
FIG. 3 is a flowchart illustrating how the wireless circuit in accordance with the embodiment of the present invention controls a connection destination.

The following description will discuss an embodiment (Embodiment 1) of the present invention, with reference to FIGS. 1 through 3.

(Wireless Circuit)

FIG. 1 is a block diagram illustrating a schematic configuration of a wireless circuit 100 in accordance with Embodiment 1. The wireless circuit 100 includes antennas (first antennas) 11 and 12, a duplexer (first high-frequency circuit device) 13, a filter (first high-frequency circuit device) 14, low noise amplifiers (LNAs) (first high-frequency circuit devices) 15 and 17, a power amplifier (first high-frequency circuit device) 16, mixers (first high-frequency circuit devices) 18 through 20, A/D converters (analog-to-digital converters) (first high-frequency circuit devices) 21 and 23, a D/A converter (digital-to-analog converter) (first high-frequency circuit device) 22, antennas (second antennas) 31 and 32, a switch (second high-frequency circuit device) 33, filters (second high-frequency circuit devices) 34 through 36, LNAs (second high-frequency circuit devices) 37 and 39, a power amplifier (second high-frequency circuit device) 38, mixers (second high-frequency circuit devices) 40 through 42, A/D converters (second high-frequency circuit devices) 43 and 45, a D/A converter (second high-frequency circuit device) 44, a modem processing section (first modem processing section) 51, a modem processing section (second modem processing section) 61, and a control section 70.

The antennas 11 and 12, the duplexer 13, the filter 14, the LNAs 15 and 17, the power amplifier 16, the mixers 18 through 20, the A/D converters 21 and 23, and the D/A converter 22 constitute an LTE block 10 for making LTE communications. The antennas 31 and 32, the switch 33, the filters 34 through 36, the LNAs 37 and 39, the power amplifier 38, the mixers 40 through 42, the A/D converters 43 and 45, and the D/A converter 44 constitute a Wi-Fi/LTE-U block 30 for making Wi-Fi communications and LTE-U communications. The modem processing section 51 constitutes a LTE/LTE-U block 50 for making LTE communications and LTE-U communications. The modem processing section 61 constitutes a Wi-Fi block 60 for making Wi-Fi communications.

In a case where an LTE communication is made, the wireless circuit 100 operates in the following manner. In a case where a wireless signal is to be transmitted, (i) the control section 70 generates a transmission signal, (ii) the modem processing section 51 modulates the transmission signal thus generated, (iii) the D/A converter 22 converts, into an analog form, the transmission signal thus modulated, (iv) the mixer 19 up-converts the transmission signal thus converted, (v) the power amplifier 16 amplifies the transmission signal thus up-converted, (vi) the duplexer 13 passes the transmission signal thus amplified to the antenna 11, and then (vii) the antenna 11 radiates the analog transmission signal thus passed. In a case where wireless signals are to be received, (i) the antennas 11 and 12 receive respective received signals, (ii) the duplexer 13 and the filter 14 pass the respective received signals to the respective LNAs 15 and 17, (iii) the LNAs 15 and 17 amplify the respective received signals thus passed, (iv) the mixers 18 and 20 down-convert the respective received signals thus amplified, (v) the A/D converters 21 and 23 convert, into a digital form, the respective received signals thus down-converted, (vi) the modem processing section 51 demodulates the respective received signal thus converted, and then (vii) the control section 70 processes the respective received signals thus demodulated.

In a case where a Wi-Fi communication is made, the wireless circuit 100 operates in the following manner. In a case where a wireless signal is to be transmitted, (i) the control section 70 generates a transmission signal, (ii) the modem processing section 61 modulates the transmission signal thus generated, (iii) the D/A converter 44 converts, into the analog form, the transmission signal thus modulated, (iv) the mixer 41 up-converts the transmission signal thus converted, (v) the power amplifier 38 amplifies the transmission signal thus up-converted, (vi) the filter 35 and the switch 33 pass the transmission signal thus amplified to the antenna 31, and then (vii) the antenna 31 radiates the transmission signal thus passed. In a case where wireless signals are to be received, (i) the antennas 31 and 32 receive respective received signals, (ii) the switch 33 and the filters 34 and 36 pass the respective received signals to the respective LNAs 37 and 39, (iii) the LNAs 37 and 39 amplify the respective received signals thus passed, (iv) the mixers 40 and 42 down-convert the respective received signals thus amplified, (v) the A/D converters 43 and 45 convert, into the digital form, the respective received signals thus down-converted, (vi) the modem processing section 61 demodulates the respective received signals thus converted, and then (vii) the control section 70 processes the respective received signals thus demodulated.

In a case where an LTE-U communication is made, the wireless circuit 100 operates in the following manner. In a case where a wireless signal is to be transmitted, (i) the control section 70 generates a transmission signal, (ii) the modem processing section 51 modulates the transmission signal thus generated, (iii) the D/A converter 44 converts, into the analog form, the transmission signal thus modulated, (iv) the mixer 41 up-converts the transmission signal thus converted, (v) the power amplifier 38 amplifies the transmission signal thus up-converted, (vi) the filter 35 and the switch 33 pass the transmission signal thus amplified to the antenna 31, and then (vii) the antenna 31 radiates the transmission signal thus passed. In a case where wireless signals are to be received, (i) the antennas 31 and 32 receive respective received signals, (ii) the switch 33 and the filters 34 and 36 pass the respective received signals to the respective LNAs 37 and 39, (iii) the LNAs 37 and 39 amplify the respective received signals thus passed, (iv) the mixers 40 and 42 down-convert the respective received signals thus amplified, (v) the A/D converters 43 and 45 convert, into the digital form, the respective received signals thus down-converted, (vi) the modem processing sections 51 demodulates the respective received signals thus converted, and then (vii) the control section 70 processes the respective received signals thus demodulated.

As described above, (i) while an LTE communication is being made, the LTE block 10 and the LTE/LTE-U block 50 operate, (ii) while a Wi-Fi communication is being made, the Wi-Fi/LTE-U block 30 and the Wi-Fi block 60 operate, and (iii) while an LTE-U communication is being made, the Wi-Fi/LTE-U block 30 and the LTE/LTE-U block 50 operate.

The LTE communication and the LTE-U communication are made with use of different blocks including respective antennas and respective high-frequency circuit devices. It is therefore possible to concurrently make the LTE communication and the LTE-U communication, i.e., it is possible to make the LTE-U communication so that the LTE communication is accompanied by the LTE-U communication. This ultimately makes it possible to achieve, for example, a carrier aggregation or a supplemental downlink. Note that, since the Wi-Fi communication shares, with the LTE-U communication, a single block including antennas and high-frequency circuit devices, it is not possible to concurrently make the Wi-Fi communication and the LTE-U communication.

Furthermore, (i) the LTE/LTE-U block 50 is shared by the LTE communication and the LTE-U communication and (ii) the Wi-Fi/LTE-U block 30 is shared by the Wi-Fi communication and the LTE-U communication. This allows a reduction in the number of components.

(System)

FIG. 2 is a view illustrating an example configuration of a main part of a system 1 in which the wireless circuit 100 in accordance with Embodiment 1 is employed. The system 1 includes an LTE base station (eNB) 2, a Wi-Fi base station (access point (AP)) 4, an LTE-U base station 6, and a communication device 8. The communication device 8 includes the wireless circuit 100. FIG. 2 also illustrates (i) an LTE communication area 3 where the communication device 8 can be connected to the LTE base station 2, (ii) a Wi-Fi communication area 5 where the communication device 8 can be connected to the Wi-Fi base station 4, and (iii) an LTE-U communication area 7 where the communication device 8 can be connected to the LTE-U base station 6.

As illustrated in FIG. 2, there is a situation where the communication device 8 is located within all of the LTE communication area 3, the Wi-Fi communication area 5, and the LTE-U communication area 7.

In such a situation, since the wireless circuit 100 of the communication device 8 cannot concurrently make the Wi-Fi communication and the LTE-U communication, (the control section 70 of) the wireless circuit 100 determines which of the Wi-Fi base station and the LTE-U base station 6 a connection destination should be, in the following manner.

(Control of Connection Destination)

FIG. 3 is a flowchart illustrating how the control section 70 controls the connection destination of the wireless circuit 100. In a step S1, the control section 70 checks a surrounding radio-wave condition. Specifically, the foregoing LTE-U receiving operation and Wi-Fi receiving operation are carried out so that the control section 70 searches a receiving frequency band by checking whether or not there is a downlink signal from a surrounding base station. At the same time, the control section 70 checks whether or not the communication device 8 can be connected to the surrounding base station, and calculates received power based on a reference signal contained in a received signal. Note that checking whether or not the communication device 8 can be connected to the surrounding base station refers to determination of whether or not the communication device 8 is in a condition where the communication device 8 cannot be connected to the surrounding base station for reason that, for example, the surrounding base station belongs to a different network carrier or the surrounding base station is a connection-limited Wi-Fi base station.

In a case where, as a result of the step S1, it is checked that a connection destination of the LTE-U communication coexists with a connection destination of the Wi-Fi communication (YES in a step S2), the control section 70 compares a value of received power of the LTE-U communication with a value of received power of the Wi-Fi communication (step S3). In a case where the value of received power of the LTE-U communication is higher by at least X[dB/MHz] than the value of received power of the Wi-Fi communication (YES in a step S3), the control section 70 determines that the wireless circuit 100 should make the LTE-U communication. The control section 70 then controls the wireless circuit 100 to make a connection with the LTE-U base station 6 (step S4). Meanwhile, in a case where the value of received power of the LTE-U communication is not higher, by less than X[dB/MHz], than the value of received power of the Wi-Fi communication (NO in the step S3), the control section 70 determines that the wireless circuit 100 should make the Wi-Fi communication. The control section 70 then controls the wireless circuit 100 to make a connection with the Wi-Fi base station 4 (step S5). Note that [dB/MHz] indicates a power ratio per bandwidth.

Note also that the above "X" is a value that is set beforehand based on which one of the LTE-U communication and the Wi-Fi communication is prioritized. For example, by setting the "X" to be a negative value, it is possible to prioritize the LTE-U communication, which has more advantages than the Wi-Fi communication.

As described above, the control section 70 controls the wireless circuit 100 such that, in a case where a value of received power of a wireless communication made by the LTE-U (third wireless communication method) is lower than a total value of (i) a value of received power of a wireless communication made by the Wi-Fi (second wireless communication method) and (ii) a predetermined value, the wireless circuit 100 makes a wireless communication by the Wi-Fi (second wireless communication method), whereas in a case where the value of received power of the wireless communication made by the LTE-U is not lower than the total value, the wireless circuit 100 makes a wireless communication by the LTE-U (third wireless communication method). The control section 70 also controls the wireless circuit 100 such that, in a case where the value of received power of the wireless communication made by the LTE-U (third wireless communication method) is equal to or higher than the total value of the value of received power of the wireless communication made by the Wi-Fi (second wireless communication method) and the predetermined value, the wireless circuit 100 makes a wireless communication by the LTE-U (third wireless communication method), which wireless communication can be made in a collaborative manner with a wireless communication made by the LTE (first wireless communication method). Meanwhile, in a case where the value of received power of the wireless communication made by the LTE-U (third wireless communication method) is lower than the total value of the value of received power of the wireless communication made by the Wi-Fi (second wireless communication method) and the predetermined value, the wireless circuit 100 makes a wireless communication by the Wi-Fi (second wireless communication method). This makes it possible to make efficient communications.

Note that in a case where, as a result of the step S1, (i) it is checked that only one of the connection destination of the LTE-U communication and the connection destination of the Wi-Fi communication exists (NO in the step S2) and (ii) the connection destination of the LTE-U communication exists (YES in a step S6), the step S4 is proceeded with. Whereas, in a case where the connection destination of the LTE-U communication does not exist (NO in the step S6), the step S5 is proceeded with.

(Variation of Control of Destination)

Note that the control section 70 can alternatively control the wireless circuit 100 such that the wireless circuit 100 makes, in a time division manner, a wireless communication by the Wi-Fi (second wireless communication method) and a wireless communication by the LTE-U (third wireless communication method). That is, the control section 70 can be configured to switch, at given time intervals, whether the Wi-Fi/LTE-U block 30 is used for the Wi-Fi communication or for the LTE-U communication. This allows (i) the wireless communication by the Wi-Fi (second wireless communication method) and (ii) the wireless communication by the LTE-U (third wireless communication method) to be made in a collaborative manner while the wireless circuit 100 is being concurrently connected to the Wi-Fi base station 2 and the LTE-U base station 4.

Embodiment 2

The Wi-Fi/LTE-U block 30, which is shared by the Wi-Fi communication and the LTE-U communication, only needs to include at least one antenna (second antenna) and at least one high-frequency circuit device (second high-frequency circuit device). In addition to the above high-frequency circuit device (second high-frequency circuit device), the Wi-Fi/LTE-U block 30 can be configured to further include (i) a high-frequency circuit device for the Wi-Fi communication and (ii) a high-frequency circuit device for the LTE-U communication. The following description will illustrate such a configuration. Note, however, that for convenience, any member that is identical in function to the corresponding member described in Embodiment 1 is assigned an identical reference numeral, and will not be described here.

Figure 4:
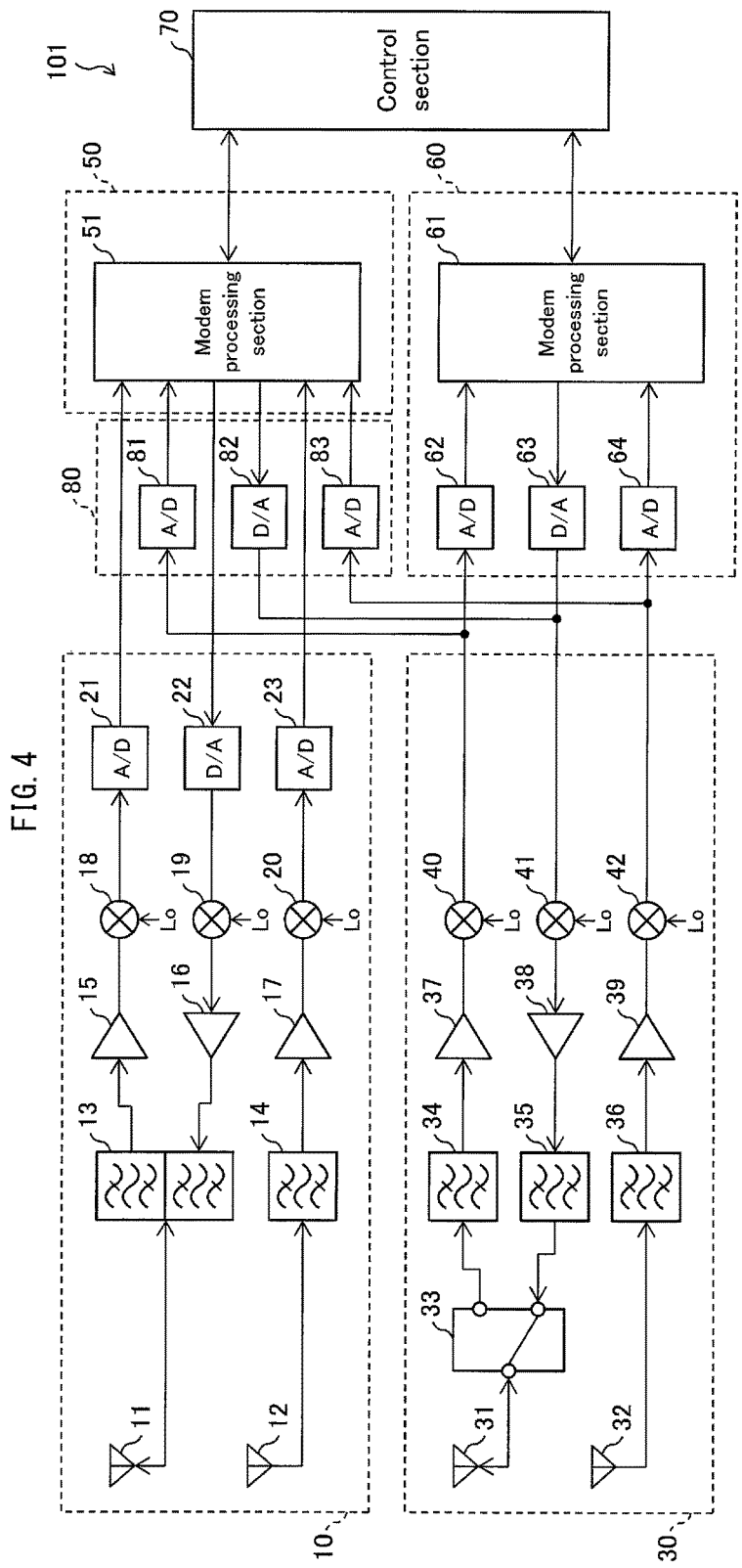
FIG. 4 is a block diagram illustrating a schematic configuration of a wireless circuit in accordance with another embodiment of the present invention.

FIG. 4 is a block diagram illustrating a schematic configuration of a wireless circuit 101 in accordance with another embodiment (Embodiment 2) of the present invention. The wireless circuit 101 is different from the wireless circuit 100 in including A/D converters 62, 64, 81, and 83 and D/A converters 63 and 82, instead of the A/D converters 43 and 45 and the D/A converter 44. Accordingly, a Wi-Fi/LTE-U block 30 includes antennas 31 and 32, a switch 33, filters 34 through 36, LNAs 37 and 39, a power amplifier 38, and mixers 40 through 42. A Wi-Fi block 60 includes a modem processing section 61, the A/D converters 62 and 64, and the D/A converter 63. The A/D converters 81 and 83 and the D/A converter 82 constitute an LTE-U block 80 for making LTE-U communications.

As described above, it is thus possible (i) to remove part (the A/D converters 43 and 45 and the D/A converter 44) of the high-frequency circuit device (second high-frequency circuit device) constituting the Wi-Fi/LTE-U block 30 and (ii) to configure the Wi-Fi block 60 and the LTE-U block 80 to include respective high-frequency circuit devices which correspond to the high-frequency circuit devices thus removed.

Embodiment 3

Note that part or all of the antennas can be shared by the LTE block 10 and the Wi-Fi/LTE-U block 30. In other words, at least part of the antennas can be configured to be shared by the LTE communication, the Wi-Fi communication, and the LTE-U communication. The following description will discuss an example of such a configuration. Note, however, that for convenience, any member that is identical in function to the corresponding member described in Embodiment 1 or 2 is assigned an identical reference numeral, and will not be described here.

Figure 5:
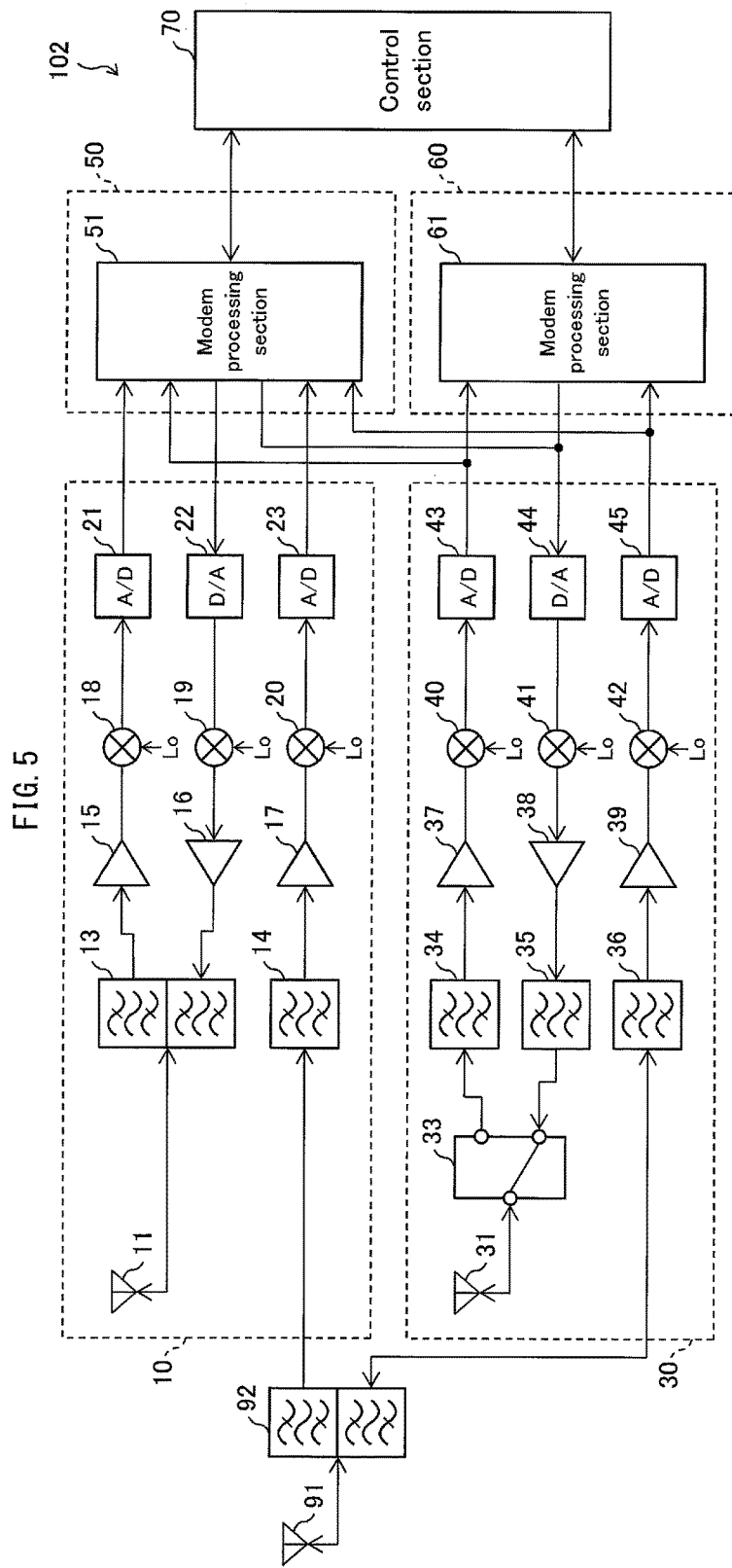
FIG. 5 is a block diagram illustrating a schematic configuration of a wireless circuit in accordance with another embodiment of the present invention.
Figure 6:
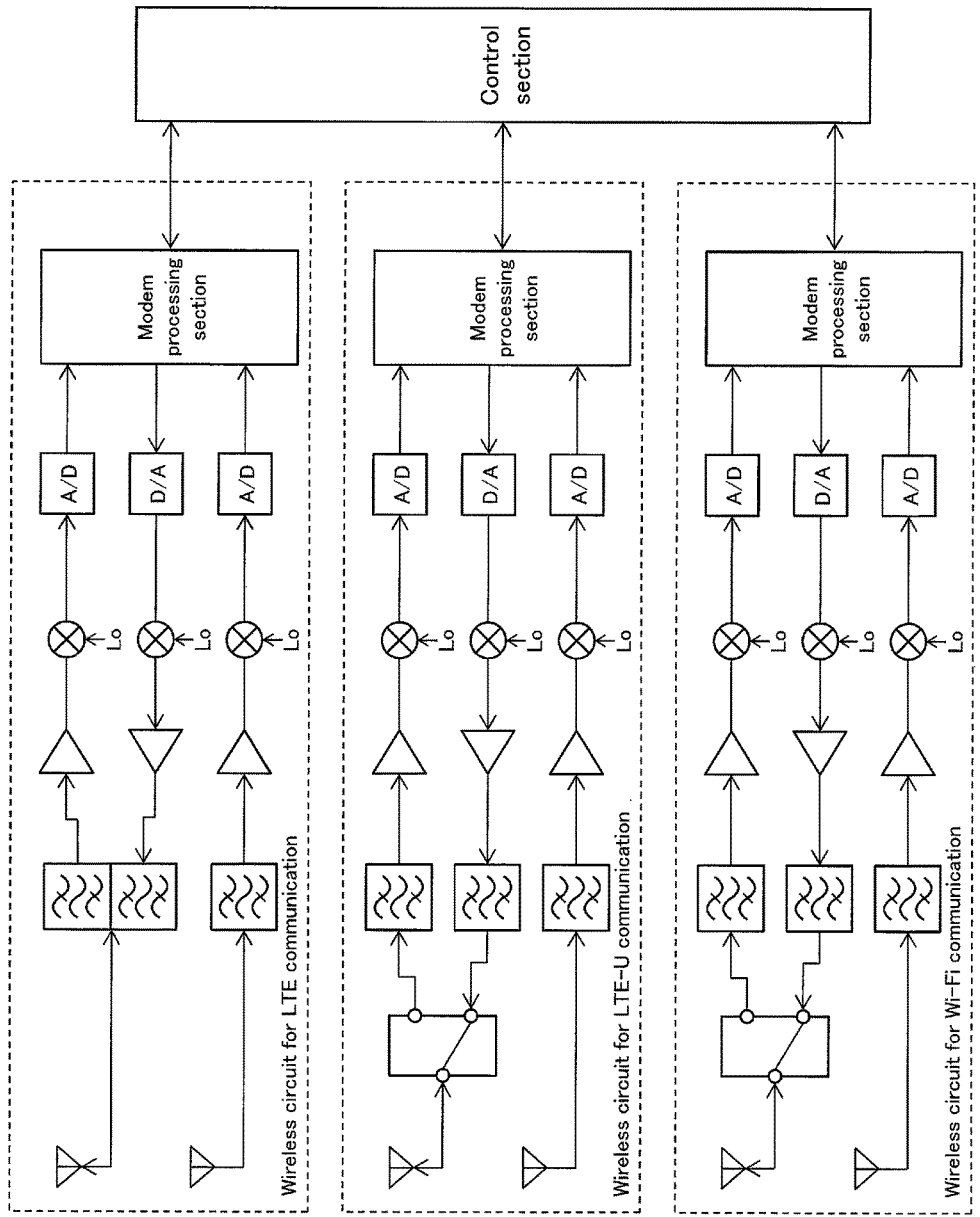
FIG. 6 is a block diagram illustrating a schematic configuration of a wireless circuit as a reference.

FIG. 5 is a block diagram illustrating a schematic configuration of a wireless circuit 102 in accordance with a further embodiment (Embodiment 3) of the present invention. The wireless circuit 102 is different from the wireless circuit 100 in including an antenna 91 and a diplexer 92, instead of the antennas 12 and 32. Accordingly, a filter 14 of an LTE block 10 and a filter 36 of a Wi-Fi/LTE-U block 30 are each connected to the antenna 12 via the diplexer 92.

In Embodiment 3, the antenna 91 is shared by the LTE block 10 and the Wi-Fi/LTE-U block 30. In other words, the antenna 91 is shared by the LTE communication, the Wi-Fi communication, and the LTE-U communication. Note that the diplexer 92 properly divides first and second signals. The first signal, which uses, for example, a 2-GHz band, is passed between the antenna 91 and the filter 14, via the diplexer 92. The second signal, which uses, for example, a 5-GHz band, is passed between the antenna 91 and the filter 36, via the diplexer 92.

[Main Points]

A wireless circuit (100) in accordance with a first aspect of the present invention includes: at least one first high-frequency circuit device (13 through 23) connected to at least one antenna; at least one second high-frequency circuit device (33 through 43) connected to at least one antenna; a first modem processing section (51) connected to the at least one first high-frequency circuit device and the at least one second high-frequency circuit device; and a second modem processing section (61) connected to the at least one second high-frequency circuit device, wherein: the at least one first high-frequency circuit device and the first modem processing section process wireless signals corresponding to a first wireless communication method, by which a first wireless communication is made through a licensed spectrum; the at least one second high-frequency circuit device and the second modem processing section process wireless signals corresponding to a second wireless communication method, by which a second wireless communication is made through an unlicensed spectrum, the second wireless communication being independently of the first wireless communication; and the at least one second high-frequency circuit device and the first modem processing section process wireless signals corresponding to a third wireless communication method, by which a third wireless communication is made through the unlicensed spectrum, the first wireless communication being accompanied by the third wireless communication.

With the configuration, the first wireless communication and the third wireless communication can be made with use of different high-frequency circuit devices. This makes it possible to make the third wireless communication so that the first wireless communication is accompanied by the third wireless communication. This ultimately makes it possible make (i) a wireless communication and a wireless communication in a collaborative manner (e.g., a carrier aggregation or a supplemental downlink used in the LTE). According to the configuration, (i) the first modem processing section is shared by the first wireless communication method and the third wireless communication method, and (ii) the second high-frequency circuit device is shared by the second wireless communication method and the third wireless communication method. This allows a reduction in the number of components. It is thus possible to achieve, with fewer components, a wireless circuit that can make plural types of wireless communications using an unlicensed spectrum.

In a second aspect of the present invention, the wireless circuit can be arranged such that, in the first aspect of the present invention, the first wireless communication method is an LTE; the second wireless communication method is a Wi-Fi; and the third wireless communication method is an LTE-U.

With the configuration, it is possible to achieve, with fewer components, a wireless circuit that can make an LTE communication, a Wi-Fi communication, and an LTE-U communication.

In a third aspect of the present invention, the wireless circuit can be arranged such that, in the first or second aspect of the present invention, the at least one second high-frequency circuit device includes one or more high-frequency circuit devices selected from a filter (34 through 36), a switch (33), a power amplifier (38), an LNA (37 and 39), an A/D converter (43 and 45), a D/A converter (44), and a mixer (40 through 42).

With the configuration, the second wireless communication method and the third wireless communication method can share one or more high-frequency circuit devices selected from a filter, a switch, a power amplifier, an LNA, an A/D converter, a D/A converter, and a mixer. This makes it possible to achieve a wireless circuit with fewer components.

In a fourth aspect of the present invention, the wireless circuit can be arranged such that, in any one of the first, second, and third aspects of the present invention, a control section controls (70) the wireless circuit such that in a case where a value of received power of the third wireless communication is lower than a total value of (i) a value of received power of the second wireless communication and (ii) a predetermined value, the wireless circuit makes the second wireless communication, and the wireless circuit otherwise makes the third wireless communication.

With the configuration, in a case where the value of received power of the third wireless communication is equal to or higher than the total value of (i) the value of received power of the second wireless communication and (ii) the predetermined value, the wireless circuit makes the third wireless communication, which can be made in a collaborative manner with the first wireless communication. Meanwhile, in a case where the value of received power of the third wireless communication is lower than the total value of (i) the value of received power of the second wireless communication and (ii) the predetermined value, the wireless circuit makes the second wireless communication. This makes it possible to make efficient communications.

In a fifth aspect of the present invention, the wireless circuit can be arranged such that, in any one of the first, second, and third aspects of the present invention, a control section (70) controls the wireless circuit such that the second wireless communication and the third wireless communication are made in a time division manner.

With the configuration, the second wireless communication and the third wireless communication can be made in the time division manner. This allows the second wireless communication and the third wireless communication to be made in a collaborative manner.

An electronic device in accordance with a sixth aspect of the present invention includes a wireless circuit of any one of the first through fifth aspects of the present invention.

With the above configuration, the electronic device brings about an effect similar to that of the above wireless circuit.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is usable in the field of production of (i) a wireless circuit and (ii) an electronic device including the wireless circuit.

REFERENCE SIGNS LIST

1: System, 2: LTE base station, 3: LTE communication area, 4: Wi-Fi base station, 5: Wi-Fi communication area, 6: LTE-U base station, 7: LTE-U communication area, 8: Communication device (electronic device), 10: LTE block, 11 and 12: Antenna (first antenna), 13: Duplexer (first high-frequency circuit device), 14: Filter (first high-frequency circuit device), 15 and 17: LNA (first high-frequency circuit device), 16: Power amplifier (first high-frequency circuit device), 18 through 20: Mixer (first high-frequency circuit device), 21 and 23: A/D converter (first high-frequency circuit device), 22: D/A converter (first high-frequency circuit device), 30: Wi-Fi/LTE-U block, 31 and 32: Antenna (second antenna), 33: Switch (second high-frequency circuit device), 34 through 36: Filter (second high-frequency circuit device), 37 and 39: LNA (second high-frequency circuit device), 38: Power amplifier (second high-frequency circuit device), 40 through 42: Mixer (second high-frequency circuit device), 43 and 45: A/D converter (second high-frequency circuit device), 44: D/A converter (second high-frequency circuit device), 50: LTE/LTE-U block, 51: Modem processing section (first modem processing section), 60: Wi-Fi block, 61: Modem processing section (second modem processing section), 62 and 64: A/D converter, 63: D/A converter, 70: Control section, 80: LTE-U block, 81 and 83: A/D converter, 82: D/A converter, 91: Antenna, 92: Diplexer, 100 through 102: Wireless circuit

The invention claimed is:

1. A wireless circuit, comprising:
at least one first high-frequency circuit device connected to at least one antenna;
at least one second high-frequency circuit device connected to at least one antenna;
a first modem processing section connected to the at least one first high-frequency circuit device and the at least one second high-frequency circuit device; and
a second modem processing section connected to the at least one second high-frequency circuit device, wherein:
the at least one first high-frequency circuit device and the first modem processing section process wireless signals corresponding to a first wireless communication method, by which a first wireless communication is made through a licensed spectrum;
the at least one second high-frequency circuit device and the second modem processing section process wireless signals corresponding to a second wireless communication method, by which a second wireless communication is made through an unlicensed spectrum, the second wireless communication being independently of the first wireless communication;
the at least one second high-frequency circuit device and the first modem processing section process wireless signals corresponding to a third wireless communication method, by which a third wireless communication is made through the unlicensed spectrum, the first wireless communication being accompanied by the third wireless communication;
the first wireless communication method is LIE;
the second wireless communication method is Wi-Fi; and
the third wireless communication method is LTE-U.

2. The wireless circuit as set forth in claim 1, wherein:
the at least one second high-frequency circuit device includes one or more high-frequency circuit devices selected from a filter, a switch, a power amplifier, an LNA, an A/D converter, a D/A converter, and a mixer.

3. The wireless circuit as set forth in claim 1, wherein:
a control section controls the wireless circuit such that in a case where a value of received power of the third wireless communication is lower than a total value of (i) a value of received power of the second wireless communication and (ii) a predetermined value, the wireless circuit makes the second wireless communication, and the wireless circuit otherwise makes the third wireless communication.

4. The wireless circuit as set forth in claim 1, wherein:
a control section controls the wireless circuit such that the second wireless communication and the third wireless communication are made in a time division manner.

* * * * *